Nov. 9, 1965        SUSUMU NOJIMA        3,217,303
COMMUNICATING SYSTEMS BY CONVERTING INTO NARROW BANDS
Filed May 24, 1961                      5 Sheets-Sheet 1

INVENTOR
SUSUMU NOJIMA
BY
ATTORNEY

United States Patent Office

3,217,303
Patented Nov. 9, 1965

3,217,303
COMMUNICATING SYSTEMS BY CONVERTING
INTO NARROW BANDS
Susumu Nojima, Tokyo, Japan, assignor to Anritsu
Dempa Kogyo Kabushiki Kaisha, Tokyo, Japan, a
company of Japan
Filed May 24, 1961, Ser. No. 112,297
7 Claims. (Cl. 340—174.1)

This invention relates to recording and reproducing systems for purposes of communication and the like, and more specifically to an improved system wherein signals having a relatively broad frequency band are converted into signals having a narrow frequency band for transmission.

The invention further contemplates a receiving system for treating the signals received to convert them to their original condition for reproduction.

In general image signals such as those encountered in television and similar facsimile devices have relatively wide variations both in frequency as well as signal density and accordingly very broad band equipment is required to permit transmission and reception of such signals with good fidelity. When broad frequency bands are required exceedingly high quality and relatively expensive equipment is needed for both transmission and reception and furthermore, such transmission takes up a relatively large portion of the frequency spectrum. For this reason various systems have been proposed for recording the frequency range or band of signals and then returning the signals to their original state, but such systems have been found to be unsatisfactory and do not afford a practical and dependable mode for the attainment of the desired ends.

This invention has as one of its objects the provision of a novel and improved system for treating signals such as image signals and the like to facilitate their transmission with relatively narrow band equipment and, upon reception, effecting expansion of the signals to their original form to enable reproduction.

Another object of the invention resides in the provision of a novel and improved method and apparatus for modifying the density of image signals and the like for purposes of transmission over relatively narrow bands and for expanding the received signals to return them to their original condition for reproduction.

A further object of the invention resides in the provision of a novel and improved method and apparatus for recording image and other signals by utilizing the signals themselves to produce a control signal for modifying the density of information carried by such signals in order to effect compression to facilitate transmission within a band of frequencies substantially narrower than the band of frequencies that would normally be required and for automatically reversing the process for reproduction of the information.

The above and other objects will become more apparent from the following description and accompanying drawings forming part of this application.

In the drawings:

FIGURE 1a is a diagrammatic representation of signals to be treated in accordance with the invention;

FIGURE 1b is a diagrammatic representation of the signals of FIGURE 1a which have been treated for transmission;

FIGURE 2a is a diagrammatic representation of a mode of recording on magnetic tape that may be utilized with this invention;

FIGURES 2b and 2c are graphical diagrams to illustrate the mode of recording shown in FIGURE 2a;

FIGURES 4a through 4d are graphical illustrations of the generation of a control signal in accordance with the invention;

FIGURE 11a is a block diagram of equipment for carrying out the form of invention shown in FIGURE 9;

FIGURES 11b through 11e show the steps in the treatment of the signals by the apparatus illustrated in FIGURE 11a;

FIGURE 12 illustrates one form of integrating means utilized in connection with the apparatus of FIGURE 11a;

Figures 1, 2, 3, 4, 5, 6:
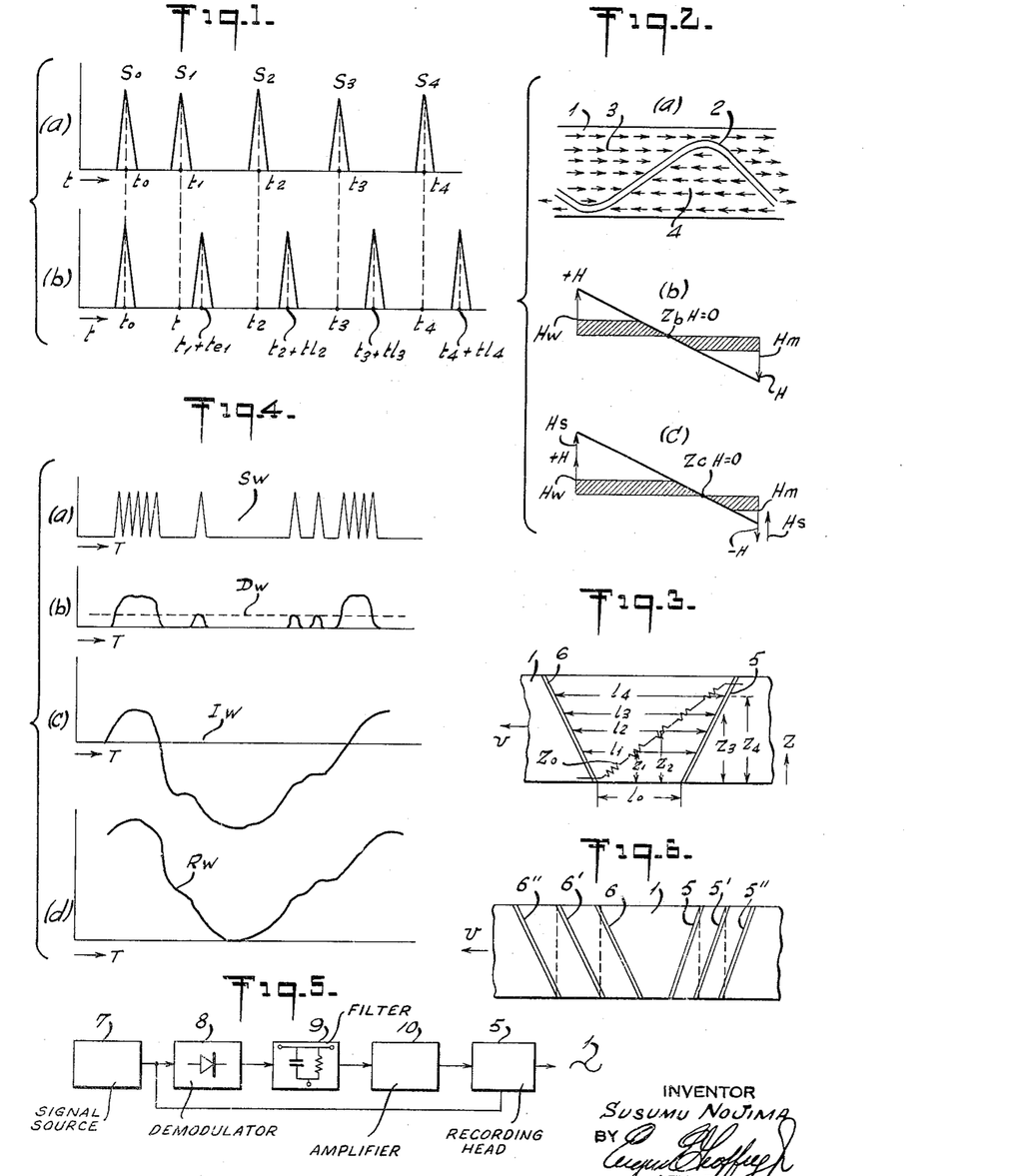
FIGURE 3 is a diagrammatic representation of a recording system for treating signals in accordance with the invention.
FIGURE 5 is a block diagram of apparatus for producing the control signals illustrated in FIGURE 4.
FIGURE 6 is a diagrammatic representation of a modified recording and reproducing system in accordance with the invention.

Referring now to FIGURE 1 and more specifically to FIGURE 1a, there is illustrated a series of pulses $S_0$ through $S_4$ in which the abscissa represents time and the ordinate represents voltage. The several signals S are illustrated as occurring at times $T_0$ to $T_4$, respectively, and it will be observed that the several signals S are displaced irregularly with respect to time. The greatest density occurs between the signals $S_0$ and $S_1$, while the minimum density occurs between the signals $S_3$ and $S_4$. With a wide variation in signal density, a relatively wide frequency band width is required for faithful transmission and reproduction, since portions of the signal having low density are of course, of relatively low frequency, while the high density signals are of relatively high frequency. In the case of normal image transmision such a encountered for instance in television, band widths of the order of 4 megacycles are required for good reproduction, and the greater the band width, the more detail obtainable in the reproduced image.

This invention provides novel and improved means for modifying the density of the signals shown in FIG. 1 and in a predetermined manner so that areas of low signal density are made more dense and areas of high signal density are made less dense. The modification of the signal density in accordance with the invention is shown in FIG. 1b and it will be observed that the signal $S_1$ has been displaced to the right by a time $TL_1$. The signal $S_2$ has been displaced by a time $TL_2$, etc., so that the resultant density of the signals as shown in FIG. 1b is substantially uniform. In this way the signals can be transmitted within a fairly narrow band width.

A recording procedure which has been found particularly effective in carrying out the invention involves the so-called boundary displacement method which formed the subject of an article entitled "Boundary-Displacement Magnetic Recording," by H. L. Daniels, which appeared in the April 1952 issue of "Electronics," published by McGraw-Hill Publishing Company, New York. This boundary deflection recording method is illustrated in FIG. 2 and it will be observed that the magnetic tape 1 has that portion above the boundary 2 magnetized to saturation in one direction, while the portion 4 below the boundary 2 is magnetized to saturation in the other direction. This leaves the intervening boundary 2 which constitutes the signal being recorded. Recording of signals by the boundary method is obtained by a special recording head embodying a plurality of laminations and the head is energized in such a manner by the signals to be recorded so that a portion of the laminations will be magnetized in one direction while another portion will be magnetized in an opposing direction. Such a head is completely and fully discussed in the article by H. L. Daniels and further discussion is not deemed necessary at this time.

In the reproduction of signals in accordance with the boundary deflection method, a standard magnetic head may be utilized and the signal introduced into the head will be a signal in accordance with the resultant difference in the two areas of magnetization of the tape. If no signal is present, one half of the tape will be magnetized in one direction and the other half will be magnetized in the other direction, thus resulting in a zero signal. However, if the boundary is displaced to one side with reference to the head, then the head will be subjected to greater magnetization in one direction and consequently a resultant signal will be reproduced.

The magnetization of the tape 1 of FIG. 2a is illustrated more clearly in FIGS. 2b and 2c. FIG. 2b shows a condition of magnetization of the tape with zero signal. In this case one half of the tape is magnetized to $+H$ while the other half is magnetized to $-H$. When $+H$ is equal to $-H$, $Z_b$ will be at the center of the tape and will have zero magnetization. The cross-sectioned portions $H_M$ indicate total magnetization of the tape. In FIG. 2c, it will be observed that the magnetization on one side has been increased by $H_S$ so that the total magnetization is $H+H_S$. Magnetization in the opposite direction has been decreased by $-H_S$ so that the total magnetization is $-H-H_S$. It will be observed that in this condition the point of zero magnetization has been shifted to the right and is denoted by $Z_c$. Thus FIG. 2b represents a condition of zero signal while FIG. 2c represents a condition when a signal is present.

With this invention, boundary deflection system of recording is modified to provide for generation of control signals corresponding to the rate of change of the signals being transmitted. This control signal is used in one form of the invention to control the position of the boundary 2 as shown in FIG. 2a by biasing the recording head in a suitable manner. FIG. 3 is illustrative of this improved recording and reproducing system and numeral 5 denotes a recording head as explained in the article by H. L. Daniels and the numeral 6 denotes a reproducing head. The two heads are arranged so that they are inclined relative to the movement of the tape denoted by the arrow $v$. The narrowest spread of the heads is denoted by $L_0$ and successive divergent portions of the heads are denoted by lines $L_1$, $L_2$, etc. By appropriately biasing the recording head 5 by a control signal the position of the boundary 2 as represented by $S_0$ when substantially zero signal is presented, will be disposed at the lower edge of the tape 1 as shown in FIG. 3. As the density of the signal being recorded increases, the boundary position will be shifted upwardly across the tape by an appropriate action of the control signal. In this way, the higher density signals will have their zero boundary displaced upwardly of the tape and at points where the recording and reproducing heads are relatively far apart. This produces the effect of increasing the speed of the recording tape for the more dense signals and decreasing the speed of the tape for the less dense signals.

The time relationship can best be understood with reference to FIGS. 1a and 1b. Let it be assumed that the signals $S_0$, $S_1$, $S_2$, etc. are recorded at positions Z, $Z_1$, $Z_2$, etc. respectively, as shown in FIG. 3. The gradually increasing distance between the recording head 5 and the reproducing head 6 are represented by $L_0$, $L_1$, etc. The speed of the tape is assumed to be V. Then it will be observed that:

$$\frac{L_1-L_0}{V}=KZ_1=T_1L_1 \quad (K \text{ equals a constant}) \quad (1)$$

Similarly, the other signal pulses $S_2$, $S_3$, $S_4$ will follow $S_0$ in accordance with the following relationships:

$$\frac{L_2-L_0}{V}=KZ_2=T_2L_2 \quad (2)$$

$$\frac{L_3-L_0}{V}=KZ_3=T_3L_3 \quad (3)$$

$$\frac{L_4-L_0}{V}=KZ_4=T_4L_4 \quad (4)$$

In light of the above it will be seen that the output of the pickup head 6 will constitute a series of signals such as shown in FIG. 1d, in which the pulse intervals are modified so that a more uniform signal density is obtained.

The generation of a control signal can best be understood by reference to FIG. 4, wherein FIG. 4a represents a typical signal $S_W$ which is to be treated in accordance with the invention. To produce the control signal, the signal $Z_W$ is detected or rectified as shown in FIG. 4b, to produce a series of envelopes $D_W$ which have pulse widths and amplitudes corresponding to the changes in density of the signal $S_W$. The signal of FIG. 4b is then integrated to produce the signal $I_W$ shown in FIG. 4c. Since a portion of this signal is negative, after integration a bias voltage is applied so that all portions of the resultant signal are of a single polarity, as shown by the curve $R_W$ in FIG. 4d. This control signal is used to modify the density of the original signal during recording and reproduction in order to enable transmission of the original signal over a relatively narrow band width.

Apparatus for producing the control signals is illustrated in FIG. 5. In this figure the numeral 7 denotes a signal source which may be an image pickup tube as used in television, facsimile apparatus or other similar devices. The signal is then introduced into the demodulator or rectifier 8 in a conventional manner. The rectified signal is then integrated as by a suitable network as illustrated in block 9. Block 10 represents an amplifier which amplifies the integrated signals and also introduces appropriate bias in a known manner to produce the resultant signal $R_W$. This signal is then fed to the recording head 5 along with the original signal developed by the block 7. The signals in the recording head are then impressed on the tape 1 in the manner previously described. It will be seen, therefore, that the control signal $R_W$ functions to bias the recording head 5 during actual recording and thus determines, in effect, the position of the boundary during the recording of the signals and, with the arrangement of elements as shown in FIG. 3, as the signals become more dense, the boundary is shifted upwardly relative to the tape while, as the signals become less dense, the boundary is shifted downwardly.

Under certain conditions the density of the signals may increase to a point that causes the generation of such a large control signal that the boundary may tend to be displaced beyond the edge of the tape. In order to compensate for this condition, a structure as shown in FIG. 6 may be employed. In this case, a plurality of recording heads 5, 5' and 5" may be employed with cooperating reproducing heads 6, 6' and 6". Suitable switching means may be employed to shift the signal being recorded to successive heads as the control signal increases. Note that the recording heads are displaced so that the bottom of head 5' is substantially in vertical alignment with the top of the head 5. A similar arrangement is provided for the reproducing heads. Thus, as the control signal increases beyond the capability of the recording and reproducing heads 5 and 6, it is then automatically shifted to the heads 5' and 6' and then to the heads 5" and 6". As the control signal decreases, the signals are again shifted back to the more closely spaced heads.

Figure 7:
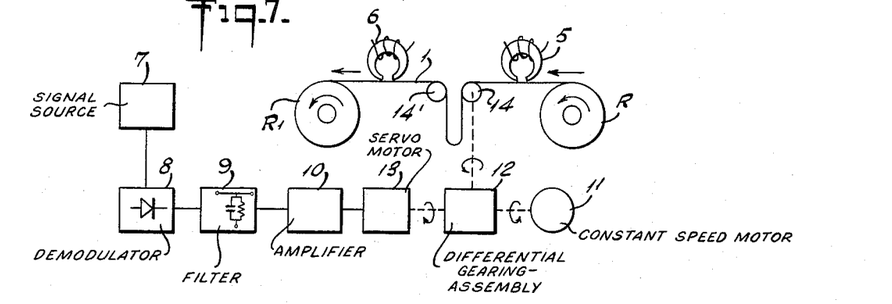
FIGURE 7 is a block diagram showing a modified method and apparatus for treating signals in accordance with the invention.

An alternate arrangement for the attainment of the objectives discussed in connection with the foregoing figures is shown in FIG. 7. In this embodiment of the invention the control signal is produced in the same manner as described in connection with FIG. 5, with the final control signal $R_T$ appearing at the output of the amplifier 10. The output signals are used to drive a servo motor 13. The magnetic tape which is carried by a spool R is fed past the recording head 5, thence over a roller 14, a second roller 14' and to the takeup spool R'. The roller 14 is driven by the output of a differential gearing assembly 12, the latter being driven by a constant speed motor 11. The resultant speed of the roller 14 is then governed by the servo motor 13 which will effect either an increase or a decrease in the speed of the roller 14 in accordance with the control signal. Thus, as the density of the signals applied to the recording head 5 increases, the speed of the roller 14 driving tape 1 increases and as the control signal decreases, the speed of the roller 14 decreases. Thus there is provided a continuously variable system which attains the same ends as described in connection with the apparatus shown in FIGS. 3 to 6, inclusive. If desired, the utilization of variable speed control for the tape 1 may be utilized in combination with the structure described in connection with FIG. 3, so that the use of the inclined heads will enable a boundary shift to be obtained for equalizing the density of the signals being recorded and at the same time an additional effect can be obtained by modifying the speed of the tape as it moves past the recording and reproducing heads 5 and 6.

Figure 8:
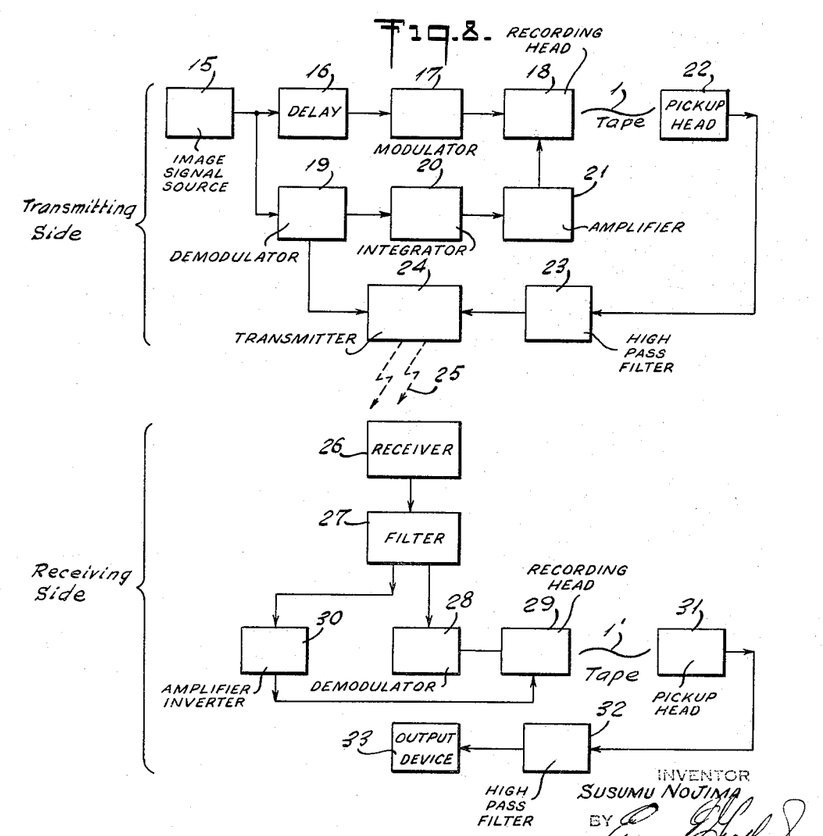
FIGURE 8 is a block diagram of transmitting and receiving apparatus utilizing the principles of the apparatus as set forth in the previous figures.

A transmitting and receiving system in accordance with the invention is shown in block diagram in FIG. 8 to illustrate the application of the invention to a complete communication system. It is to be understood that the reference to the transmission of signals implies any suitable mode of transmission as, for instance, wire or radio, or it may merely involve the direct playback of the tape.

In FIG. 8 the numeral 15 denotes a source of signals such as image signals and the like which are to be transmitted and reproduced in accordance with the invention. Signals are fed to a delaying device represented by block 16 to compensate for delays which occur in other parts of the circuitry. This is essential in order to effect the proper coordination of the control signals with the signals being recorded. After the delay produced by appropriate apparatus within the block 16, the signals are fed to a signal modulator 17, the output of which is applied to the recording winding of the boundary displacement recording head denoted by the block 18. Such a recording head is clearly described in the aforementioned article by H. L. Daniels.

A portion of the output from the signal generator or amplifier 15 is fed to a demodulator 19, then integrated by an integrating device 20 and is supplied to the recording head 18 through the amplifier 21. This latter signal operates as a control signal in the manner previously described.

The signals recorded on the tape 1 are then reproduced by a pickup head 22. The output of the pickup head is then filtered by a high pass filter 23 which effectively removes the control signals from the tape so that only the information carrying signals which have been reduced in band width appear at the input of the transmitter 24.

In addition to the information carrying signals, demodulated signals from the demodulator 19 are also fed to the input of the transmitter 24 for transmission through suitable means 25 such as wire or radio.

The receiving apparatus includes an appropriate receiver 26 such as a radio receiver and amplifier in the case of radio transmission, or possibly just an amplifier in the case of wire transmission. The output of the receiver 26 is then fed to a signal separator or filter 27 to separate the control signals from the information carrying signals. The control signals are fed to demodulator 28 and then the demodulated signals are taken out and are supplied to a winding of the recording head 29 which is substantially identical to the recording head at the transmitter. At the same time the control signals are fed through amplifier 30 and are inverted relative to the phase of the control signals at the transmitter. These signals are also applied to the recording head 29. In this way, as the information carrying signals are applied to the tape 1', the recording position is changed in a direction opposite to that effected at the transmitter. The recorded signals are then reproduced by the pickup head 31 and the output of this pickup head is fed through a high pass filter 32 to a suitable output device 33. The high pass filter 32 removes control signals from the information carrying signals. Thus it will be seen that the receiver restores the information carrying signals to their original condition and only the information carrying signals appear at the output.

In the foregoing examples pulse signals were discussed in which the pulses occurred irregularly and the density of the pulses was modified by a control signal to provide a signal for transmission in which density variations were reduced in order to facilitate transmission over narrow band equipment. The principles of the invention, however, are equally applicable to all sorts of modulated signals, as for instance, amplitude modulation, frequency modulation, position pulse modulation, density modulation, etc. A further embodiment of the invention now to be discussed involves its utilization in connection with quantized signals which are expanded in terms of time when the rate of change of the signal is great and compressed in terms of time when the rate of change of the signal is small. In this form of the invention the wave is essentially a square wave so that the rate of change of the signal is virtually infinite at the beginning and end of the pulse while it is substantially zero for the intermediate portion of each pulse.

Figure 9:
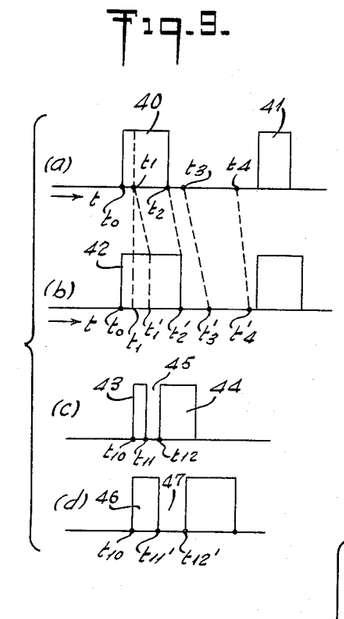
FIGURES 9a through 9d are graphical diagrams which illustrate the treatment of quantized signals in accordance with the invention.
Figure 10:
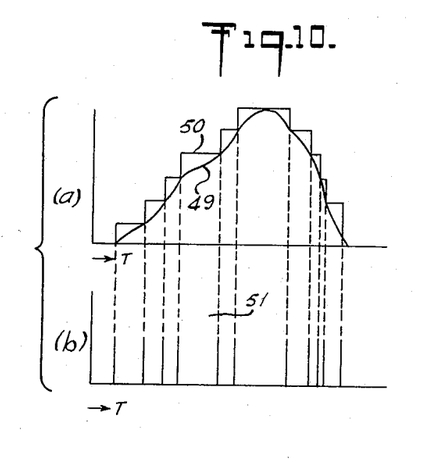
FIGURES 10a and 10b are graphical illustrations showing means for quantizing the signals illustrated in FIGURE 9.

FIG. 9 shows part of a quantized or square waved signal having a broad pulse 40 and a narrower pulse 41. The gap between the pulses is somewhat broader than the pulse widths. One method for producing a pulse signal may be, for example, that which is illustrated in FIG. 10a. The signal is represented by the curve 49 and is quantized by the step wave 50 which is then converted into pulses 51, as illustrated in FIG. 10b and the positions of the pulses of FIG. 10b represent the amplitude of the pulse at each pulse position. It may be considered that the width of the pulses 40 and 41 of FIG. 9a represent the amplitudes of the original signals.

In this method those portions RX of the signals having rapid rates of change, as for instance, the leading vertical portion of the pulse 40 may be represented by $T_2-T_0$, as illustrated in FIG. 9a. This portion of each of the pulses is elongated by a constant time $S_0$. Those portions of the signal where no change occurs, as for instance, the interval $T_2-T_1$ are compressed in time at a constant rate $\eta$. Thus, with the signals shown in FIG. 9a, the point $T_1$ is displaced to the point $T_1$, and the point $T_2$ is displaced to the point $T_2$, and a similar displacement occurs with the points $T_3$ and $T_4$. The displacement of the signal portions is illustrated in FIG. 9b. The time relationships are, more specifically, as follows:

$$T_1' - T_0' = (T_1 - T_0)\eta + \tau_0 \qquad (5)$$

$$T_2' - T_1' = (T_2 - T_1)\eta \qquad (6)$$

$$T_3' - T_2' = (T_3 - T_1)\eta + \tau_0 \qquad (7)$$

$$T_4' - T_3' = (T_4 - T_3) \qquad (8)$$

where $\eta < 1$, $T_n' > T_n (n: 0, 1, 2 \ldots)$

In Equations 5 and 7 it is not necessary to multiply $(T_1 - T_0)$ and $(T_3 - T_1)$ by $\eta$ as represented above, as it is difficult to compress those portions of the signals which do not change in amplitude and not compress those portions of the signals in which the changes are largely because of practical considerations. With this invention, however, excellent results can be attained even if the parts having relatively large rates of change are compressed at a relatively constant rate.

Considering now the case of an exceedingly narrow pulse as shown, for instance, in FIG. 9c and denoted by the numeral 43 and a relatively narrow gap 45 which follows the pulse 43, this condition is represented as follows:

$$T_{11} - T_{10} < \tau_0 \qquad (9)$$

$$T_{12} - T_{11} < \tau_0 \qquad (10)$$

The converted signals in accordance with the invention are illustrated in FIG. 9d and are represented by the pulse 46 and pulse gap 47 and may be represented by the following equations:

$$T_{11}' - T_{10}' = (T_{11} - T_{10})\eta + \tau_0 \qquad (11)$$

and $$T_{12}' - T_{11}' = (T_{12} - T_{11})\eta + \tau_0 \qquad (12)$$

While it will be observed that pulse 43 and the following gap 45 are both extended in time, the converted pulse may have the same width as the original pulse when:

$$(T_{11} - T_{10})(1 - \eta) = \tau_0 \qquad (13)$$

it will have a broader width than the original pulse when $$(T_{11} - T_{10})(1 - \pi) < \tau_0 \qquad (14)$$

and will have a narrower width than the original pulse when $$(T_{11} - T_{10})(1 - \eta) > \tau_0 \qquad (14a)$$

Assuming the shortest possible pulse width is represented by $\tau_i$ then the shortest pulse width $\tau T$ of the converted signal will be represented as $$\tau T = \tau_0 + \tau_i \eta \qquad (15)$$

Thus it will be seen that the short pulses are extended in time so that they will have a duration exceeding $\tau_0$.

The frequency band width required for transmission may be determined as follows:

$$f_i = \frac{1}{2\tau_i} \qquad (16)$$

$$f_i = \frac{1}{2(\tau_0 + \tau_i \eta)} = \frac{1}{2\tau T} \qquad (17)$$

To reproduce the transmitted signals $\tau_0$ is subtracted from the time $T_{n+1}' - T_n'$ for the initial portions of the converted signals and the remaining time is elongated at the rate of $1/\eta$.

Thus, reproduction of the signals may be represented by the following relation:

$$\{(T_{n+1}' - T_n') - \tau_0\} 1/\eta = T_{n+1} - T_n \qquad (18)$$

Figure 11:
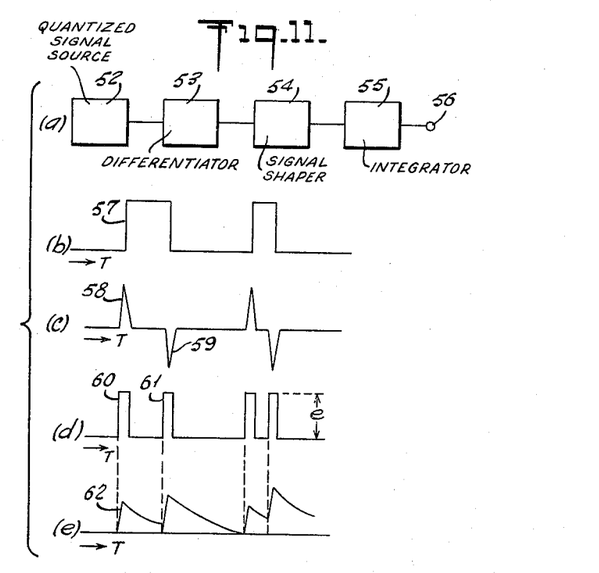

In utilizing the transmission and receiving system discussed above, boundary displacement recording as explained in connection with FIG. 3 or other memory systems may be utilized. In any of the methods, however, control signals for elongating the portions of the quantized or square wave signals by $\tau_0$ or compressing them at a constant rate $\eta$, is required. FIG. 11a illustrates a block diagram for producing the needed control signals and it includes a quantized signal source 52, a differentiation circuit 53, a signal shaping or forming circuit 54 and an integrating circuit 55. In this device a wave having rectangular pulses 57 as shown in FIG. 11b is produced by the signal source 52. This signal is differentiated by the circuit 53 and the resultant wave is illustrated in FIG. 11c with the resultant pulses identified by the numerials 58 and 59. This differentiated signal is then converted into unidirectional square waves 60 and 61 having constant amplitudes and constant widths, as shown in FIG. 11d. This conversion is effected by the forming circuit 54. The signals 60 and 61 are then integrated by the integration circuit 55 and the resultant signal is illustrated at 62 in FIG. 11e. This constitutes the control signal. It is desirable that the widths of the small rectangular square waves 60 and 61 be less than the smallest pulse width of all of the quantized signals to be transmitted.

Figure 12:
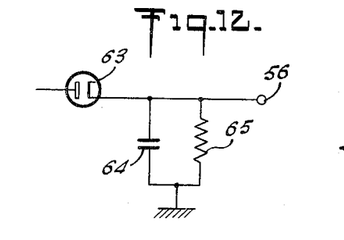

FIG. 12 illustrates one embodiment of an integration circuit 55 which may comprise a condenser 64 and resistor 65 connected in parallel and forming the load of a rectifier 63. The output is obtained from the terminal between the terminal 56 and ground. In this way the signals will be unidirectional and, because of the well known action of the integrating circuit, it is evident that the wave form 62 as shown in FIG. 11e will be produced.

Figure 13:
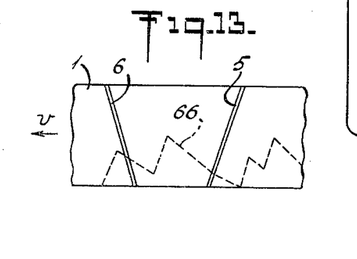
FIGURE 13 is a diagrammatic illustration to illustrate the manner in which the control signals produced in the apparatus of FIGURE 11a are applied to a recording device for recording the signals on magnetic tape.

FIG. 13 is a diagrammatic illustration of a device for converting the signals in accordance with this invention and utilizes the boundary displacement recording method as explained in connection with FIG. 3. In this figure the numeral 1 is the recording tape, the numeral 5 is a boundary displacement recording head and the numeral 6 represents a boundary displacement pickup head. Both of these heads are arranged in divergent relationship so that the narrowest portions at the bottom and the distance between the heads increases towards the top of the tape. With this arrangement elongation and compression of the signals in terms of time can be obtained by application of the control signals to a winding on the recording head. Thus, portions of the carrying signals having large rates of variation are uniformly elonated by $\tau_0$ and other portions are uniformly contracted at the rate of $\eta$. In the reproduction of these signals at the receiver, reverse operations are performed to obtain the original signals.

Figure 14:
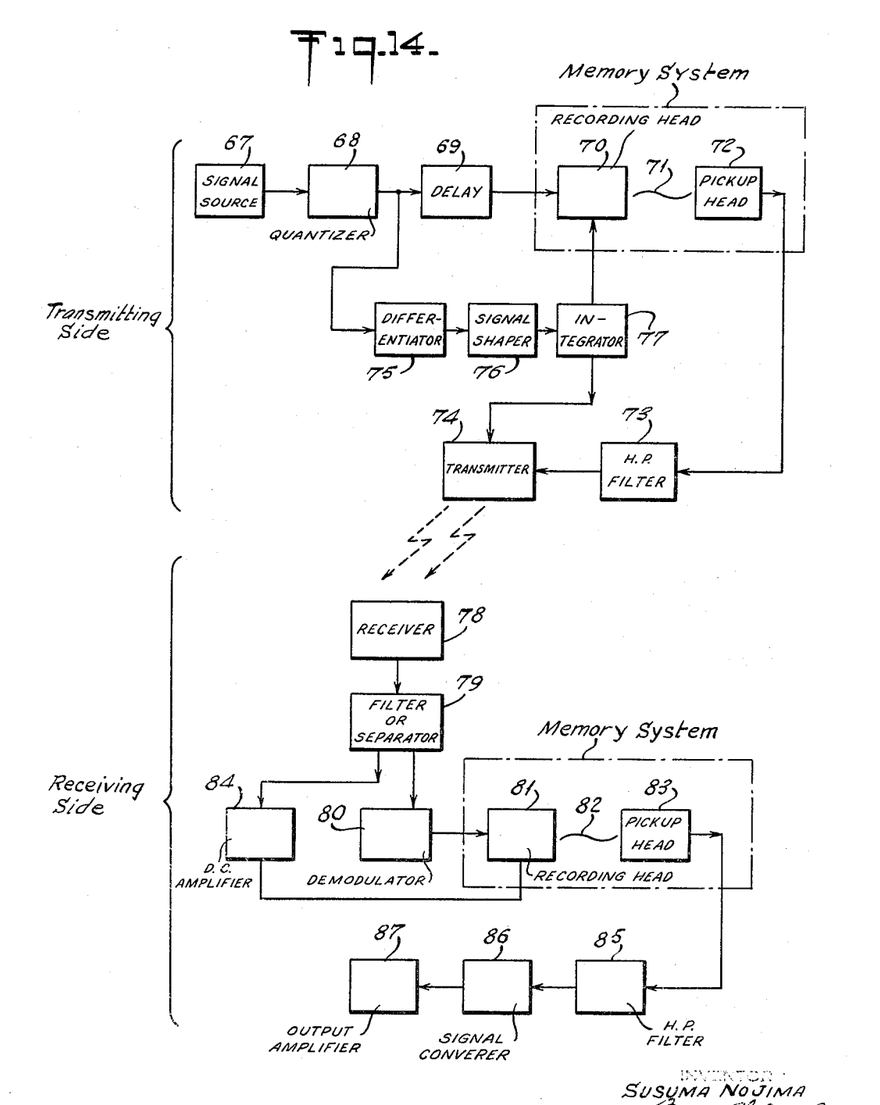
FIGURE 14 is a block diagram of transmitting and receiving apparatus for compressing and expanding signals in accordance with the form of the invention illustrated in FIG. 9.

FIG. 14 illustrates a communications system in accordance with the invention. In this figure, 67 is a source of signals to be transmitted, while the block 68 is a quantizing device. The block 69 is a delaying device and the memory portion involving the blocks 70 and 72 and the tape 71 is a boundary displacement system such as previously described, with the block 70 representing the recording head and the block 72 representing the pickup head.

The block 73 is a high pass filter and the block 74 represents a conventional transmitter. The output of the quantizing device 68 is fed to both the delaying device 69 as well to differentiation means 75. The differentiated signals from the block 75 is fed to the signal shaping or forming circuit 76 into an integrator 77, all as previously described. The output of the integrator 77 is fed to the recording head 70 along with the output from the delaying device 69. The signals obtained from the pickup head 72 are fed to the transmitter 74 and at the same time control signals from the integrator 77 are also fed to the transmitter 74. The transmitter 74 may be of any construction and may even simulate wire lines over which the signals are sent to another station. The receiver includes an appropriate receiving device 78 for receiving the signals either by radio or wire. The received signals are then fed to a separator 79 for separating the control signals from the treated information carrying signals.

The information carrying signals are fed to the signal demodulator 80 and thence to a winding on a recording head represented by the block 81. Simultaneously, the control signals from the separator 79 are fed to a D.C. amplifier 84, the output of which is fed to another winding on the recording head 81. The D.C. amplifier presents the signals to the recording head at the desired amplitude and polarity. The signals recorded on the tape 82 are then picked up by the pickup head 83 and are fed to a high pass filter 85 to remove the control signals, thence to a reproducing device 86 which converts the quantized signals to the original signals and these original signals are then amplified in an output amplifier 87.

By utilizing magnetic recording tape as a memory device as expalined above, an effective and efficient system is obtained, though it is understood that other suitable memory deivces could also be utilized.

Figure 15:
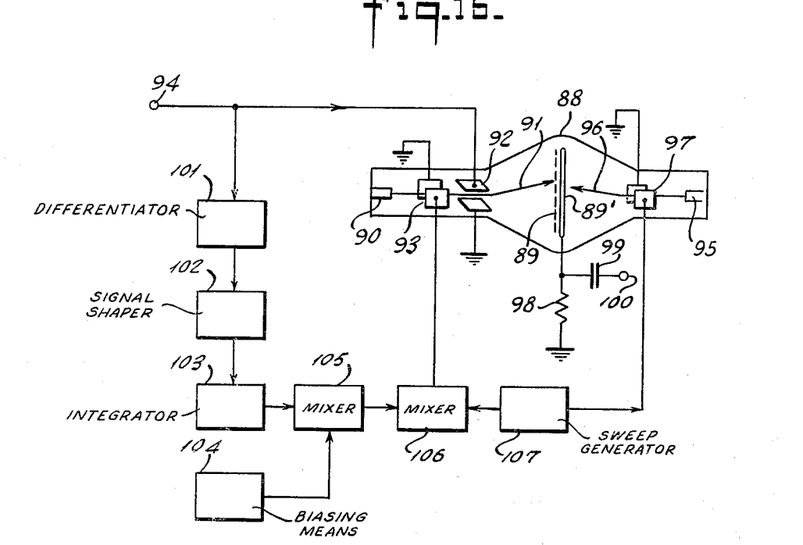
FIGURE 15 is a diagrammatic illustration of one form of the invention utilizing storage tubes for attainment of the desired ends.

Another modification of the invention is illustrated in FIG. 15 which utilizes a storage tube as a memory device. In this figure the storage tube is denoted by the numeral 88 which includes a storage electrode 89, an electron gun 90, an electron beam 91 produced by the gun 90, a vertical deflecting system 92 and a horizontal deflecting system 93. The read-out portion of the tube includes a read-out gun 95 producing an electron beam 96 and a horizontal deflection system 97. The output electrode 89' is connected to a load resistor 98 and the side of the resistor connected to the output electrode 89' is also connected to a condenser 99 and output terminal 100.

Figure 16:
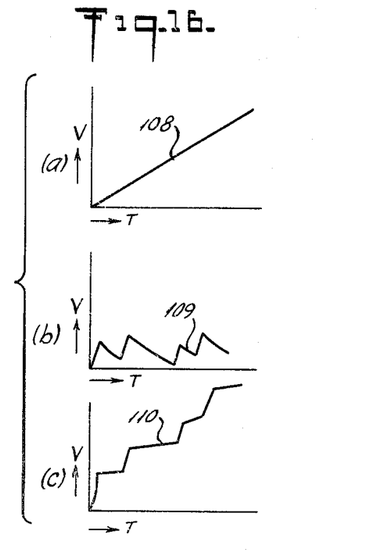
FIGURES 16a through 16c are graphs showing wave form for effecting the deflection of the electron beam in the storage tube of FIGURE 15.

The quantized signals to be transmitted are supplied to the input terminals 94 and are fed to one of the vertical deflecting electrodes 92 into a differentiating circuit 101. The second of the two vertical deflecting electrodes is connected to ground. The output of the differentiation circuit 101 is fed to the signal shaping or forming device 102 and thence to the integrating circuit 103. The output of the integrator 103 is fed to a circuit 105 which combines the integrated signal with the output of biasing means 104 in order to produce an output control signal 109 as shown in FIG. 16b. The block 106 represents a mixing circuit for combining both the control signal from the block 105 and output of the time axis sweep voltage generated by the circuit represented by the block 107. The time axis sweep voltage is illustrated in FIG. 16a. The output of the mixer 106 is fed to the horizontal deflecting system 93 of the tube 88.

The time axis sweep voltage produced by the apparatus 107 deflects the recording electron beam 91 at a constant rate. This deflecting voltage, however, does not have a uniform inclination relative to the horizontal or time axis but has both shallow and steep portions as illustrated at 110 in FIG. 16c. This non-uniformity results from the variations in the control signal shown in FIG. 16b, since the control signal and the sweep signal are combined by the mixing circuit 106. Since the electron beam 91 is deflected in a horizontal direction rapidly and slowly, as the case may be, it records the information carrying signals at rates of time which are different from the original signals, thus effecting expansion and compression, as previously described. The horizontal deflecting system 97 is supplied from the same generator which supplies the horizontal recording system and thus, if the pulse waves have forms as illustrated at 111 and 112 in FIG. 17a, then, as the electron beam 96 sweeps the output electrode in a direction denoted by the arrow 113 with a constant speed, it will produce two pairs of pulses 114 and 115, as shown in FIG. 17b, and this output will be obtained at terminal 100.

Figure 17:
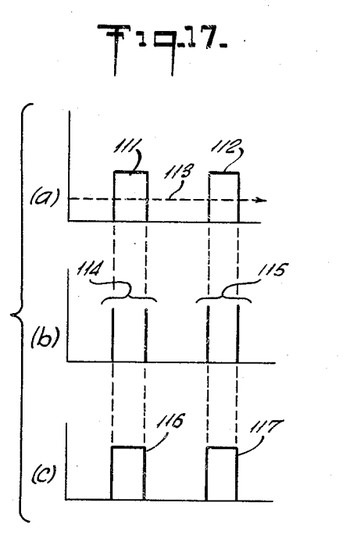
FIGURES 17a through 17c are graphical illustrations of wave forms obtained from the storage tube and treated in accordance with the invention.

If the pairs of pulses 114 and 115 are bridged by suitable electronic circuitry, square wave pulses as indicated at 116 and 117 in FIG. 17c are obtained.

It therefore follows that the quantized original signals can be reproduced if these signals are transmitted to the receiver by suitable means and the receiver utilizes a similar system to reverse the process of the transmitter. It is obvious from the foregoing explanation that signals having a broad frequency band can be transmitted by converting them effectively and reliably into signals having a narrow frequency band width, and it is effective with all types of signals including pulse modulation signals having a large variation of density. Furthermore, in accordance with the invention, the length of the original signal to be transmitted is not necessarily equal to the length of the signal converted into the narrow band width through elongating and compressing procedures, but this discrepancy is not significant as it is of small magnitude and the signals are generally compressed and elongated about a median point.

While only certain embodiments of the invention have been illustrated and described, it is clearly to be understood that changes and modifications may be made without departing from the true scope and spirit of the invention as defined by the appended claims.

What is claimed is:

1. A communication system for the transmission and reception of information carrying signals comprising means responsive to the information carrying signals for producing a voltage variable in accordance with the rates of change of the information carrying signals, integrating means for integrating said varying voltage to produce a control signal, a first memory device, means for feeding the control signal and the information carrying signal to said memory device to effect elongation of the information carrying signals of high density and compression of information carrying signals of low density in accordance with instant values of said control signal, a read-out device for removing the recorded signal from the memory device at a constant read-out speed, means for transmitting the signal obtained from said read-out device to a receiver, means at the receiver including a second memory device and a read-out device, means for separating the treated information carrying signals and said control voltage and feeding them to said memory device to reverse the treating process of the transmitter, said read-out device removing the received and recorded information carrying signals to reproduce the information carrying signals in their original form, said first and second memory devices each including a boundary displacement magnetic recording head and a magnetic tape for recording signals said read-out devices being magnetic pickup heads, said recording and pickup heads being arranged in spaced relationship relative to said magnetic tape and in divergent relationship, and said control signal being fed to the first memory device to shift the recording position on said tape to a point where the distance between the heads is large when the density of the signals is large and to a recording position on said tape where the distance between the heads is small when the density of the signals being recorded is small and the control signal fed to said second memory device shifts the recording position of the signal on the magnetic tape of said second memory device in a direction opposite to that obtaining in said first memory device.

2. A communication system according to claim 1 wherein each of said memory devices includes at least two recording heads and at least two pickup heads with each of said recording heads being in spaced parallel relationship with one edge of one recording head being in transverse alignment relative to said magnetic tape with the other end of the other recording head and wherein at least two pickup heads are arranged in parallel relationship corresponding to an arrangement of said recording heads, said system further including means responsive to said control signal to shift the recording and read-out operations from the innermost heads to the outermost heads in accordance with changes in magnitude of the control signal.

3. A communication system for the transmission and reception of information carrying signals comprising means responsive to the information carrying signals for producing a voltage variable in accordance with the rates of change of the information carrying signals, integrating means for integrating said varying voltage to produce a control signal, a first memory device, means for feeding the control signal and the information carrying signal to said memory device to effect elongation of the information carrying signals of high density and compression of information carrying signals of low density in accordance with instant values of said control signal, a read-out device for removing the recorded signal from the memory device at a constant read-out speed, means for transmitting the signal obtained from said read-out device to a receiver, means at the receiver including a second memory device and a read-out device, means for separating the treated information carrying signals and said control voltage and feeding them to said memory device to reverse the treating process of the transmitter, said read-out device removing the received and recorded information carrying signals to reproduce the information carrying signals in their original form, said first and second memory devices each including a magnetic recording head and magnetic tape on which said signals are recorded and said read-out devices each including a magnetic pickup head, said system further including variable speed means for transporting said magnetic tape relative to said recording head, and said control voltage operating said variable speed means in accordance with the magnitude of the control voltage.

4. A communication system for the transmission and reception of information carrying signals comprising means responsive to the information carrying signals for producing a voltage variable in accordance with the rates of change of the information carrying signals, integrating means for integrating said varying voltage to produce a control signal, a first memory device, means for feeding the control signal and the information carrying signal to said memory device to effect elongation of the information carrying signals of high density and compression of information carrying signals of low density in accordance with instant values of said control signal, a read-out device for removing the recorded signal from the memory device at a constant read-out speed, means for transmitting the signal obtained from said read-out device to a receiver, means at the receiver including a second memory device and a read-out device, means for separating the treated information carrying signals and said control voltage and feeding them to said memory device to reverse the treating process of the transmitter, said read-out device removing the received and recorded information carrying signals to reproduce the information carrying signals in their original form, each of said memory devices including a boundary displacement magnetic recording head and magnetic tape on which said signals are recorded and said read-out devices each including a magnetic pickup head arranged in divergent relationship relative to its associated recording head, means for feeding said control voltage to said recording head to shift the recording position on said tape in correspondence with the density of the signals being recorded, means for varying the speed of movement of said magnetic tape past its associated recording head and means for applying said control voltage to said speed varying means to modify the velocity of the tape relative to the recording head in accordance with the magnitude of the control voltage.

5. A communication system for the transmission and reception of information carrying signals comprising means for quantizing signals to be transmitted, means for elongating the initial and terminal portions of each of the quantized pulses for a predetermined time, said initial and terminal ends of said pulses having a relatively large rate of change of signal amplitude, means for compressing the other portions of said quantized signals at a predetermined rate, means for transmitting said treated signals to a receiver, means at said receiver for compressing and elongating said signals in synchronism with the elongation and compression of the the quantized signals at the transmitter and means for treating the quantized signals to reproduce the original information carrying signal, said elongation and compression means at the transmitter and receiver being magnetic tape devices including boundary displacement recording heads and magnetic pickup heads with said recording and pickup heads being arranged in divergent relationship, said communication system including control voltage generating means with the magnitude of said control voltage varying in accordance with the rate of change of magnitude of the quantized signals and means for feeding said control voltage to said boundary displacement recording heads for modifying the recording position of the quantized signal on said magnetic tape to effect elongation and compression of said signals.

6. A communication system for the transmission and reception of information carrying signals comprising means for quantizing signals to be transmitted, means for elongating the initial and terminal portions of each of the quantized pulses for a predetermined time, said initial and terminal ends of said pulses having a relatively large rate of change of signal amplitude, means for compressing the other portions of said quantized signals at a predetermined rate, means for transmitting said treated signals to a receiver, means at said receiver for compressing and elongating said signals in synchronism with the elongation and compression of the quantized signals at the transmitter and means for treating the quantized signals to reproduce the original information carrying signal, a storage tube having means for storing a signal and means for reading out said signal, means generating a control voltage corresponding to the rate of change of magnitude of the quantized signal, connections between said control voltage generating means and said storage tube to modify the recording speed of said tube and signal generating means connected with said tube for actuating said read-out means at a constant speed.

7. A communication system for the transmission and reception of information carrying signals comprising means for quantizing signals to be transmitted, means for elongating the initial and terminal portions of each of the quantized pulses for a predetermined time, said initial and terminal ends of said pulses having a relatively large rate of change of signal amplitude, means for compressing the other portions of said quantized signals at a predetermined rate, means for transmitting said treated signals to a receiver, means at said receiver for compressing and elongating said signals in synchronism with the elongation and compression of the quantized signals at the transmitter and means for treating the quantized signals to reproduce the original information carrying signal, said elongation and compression of said quantized signals being effected by a memory device including recording and read-out means and means for generating a control voltage having a magnitude corresponding to the rate of change of magnitude of the quantized signals and means for applying said control voltage to said recording means to effect elongation and compression of said signal.

References Cited by the Examiner

UNITED STATES PATENTS

| 2,928,902 | 3/60 | Vilbig | 179—15.55 |
| 2,994,856 | 8/61 | Giel | 340—174.1 |
| 2,996,581 | 8/61 | Lord et al. | 179—15.55 |
| 3,001,180 | 9/61 | Williams | 340—174.1 |

IRVING L. SRAGOW, *Primary Examiner,*